Feb. 21, 1933.     L. J. LE CLAIR ET AL     1,898,549
SLACK ADJUSTER
Filed June 25, 1931
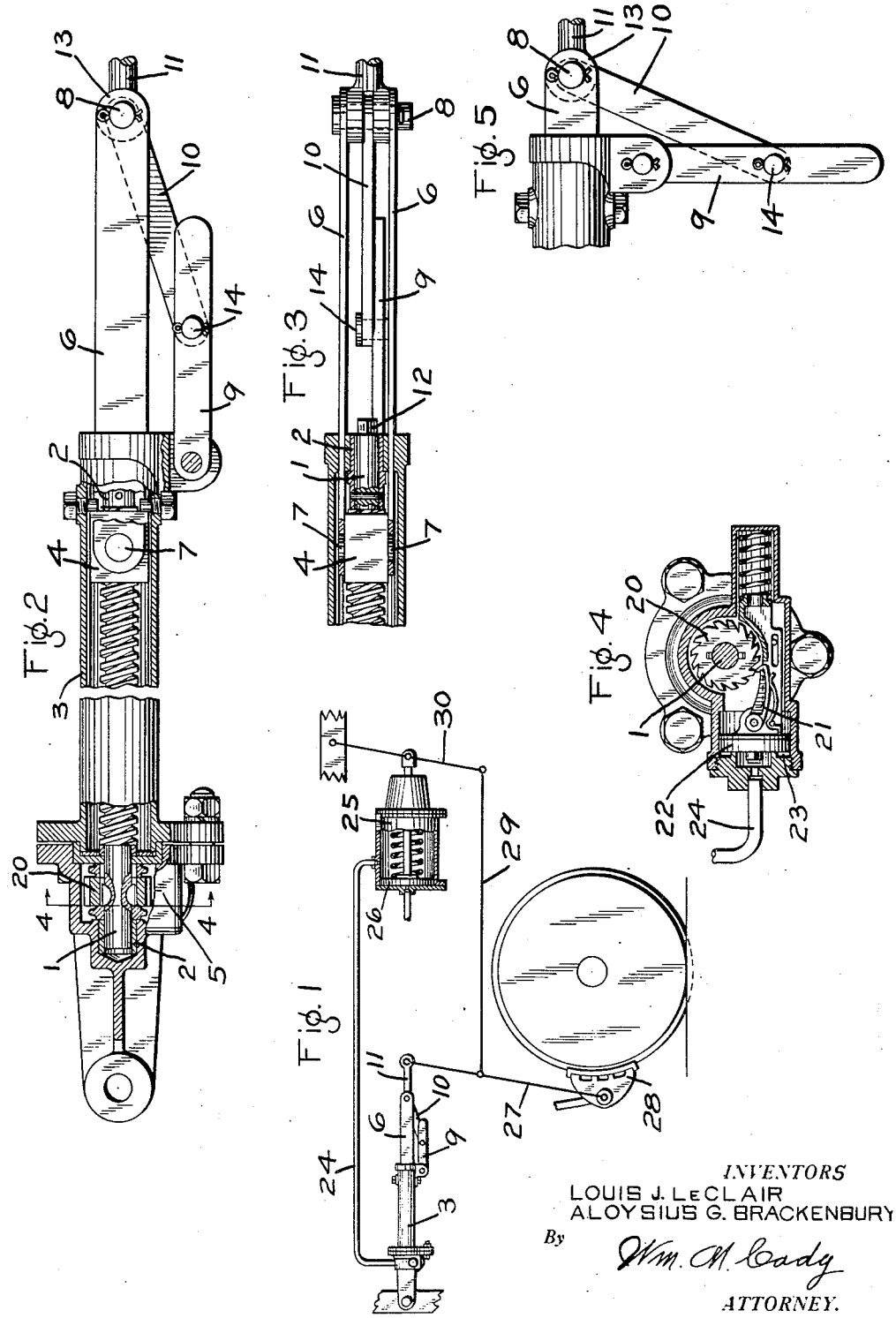
INVENTORS
LOUIS J. LeCLAIR
ALOYSIUS G. BRACKENBURY
By Wm. M. Cady
ATTORNEY.

Patented Feb. 21, 1933

1,898,549

UNITED STATES PATENT OFFICE

LOUIS J. LE CLAIR AND ALOYSIUS G. BRACKENBURY, OF KING'S CROSS, LONDON, ENGLAND, ASSIGNORS TO THE WESTINGHOUSE AIR BRAKE COMPANY, OF WILMERDING, PENNSYLVANIA, A CORPORATION OF PENNSYLVANIA

SLACK ADJUSTER

Application filed June 25, 1931, Serial No. 546,690, and in Great Britain September 17, 1930.

This invention relates to devices adapted automatically to take up the slack, due to wear for instance, in brake rigging and more particularly to devices of this character adapted to be associated with fluid pressure braking apparatus on railway or the like vehicles.

Slack adjusting devices such as are employed in connection with fluid pressure braking apparatus are usually adapted to be interposed between a brake lever and the brake rigging or between a pair of brake levers so as to constitute an adjustable transmission or tie rod and usually comprise two relatively movable parts, one of which is adapted to be displaced, automatically upon movement of the brake lever or levers, relatively to the other part in one direction or the other so as to increase or decrease the effective length of the device as a whole in accordance with the amount of slack in the rigging.

The amount of slack automatically taken up whilst the device is in service is often considerable and when the limit of the permissible relative displacement of the parts of the device has been reached the slack adjusting mechanism must be manually reset to its original position to permit further automatic adjustment.

According to the principal feature of the present invention, arrangements are provided for indicating the relative displacement of the parts of the slack adjusting device, so that the condition of the slack adjusting device may be readily ascertained from a convenient position, such as the side of the vehicle, and without the necessity of inspecting the slack adjusting mechanism itself.

In the accompanying drawing; Fig. 1 is a diagrammatic view of a brake equipment, showing our improved slack adjuster embodied therein; Fig. 2 an elevational view, partly in section, of our improved slack adjuster; Fig. 3 a plan view, partly in section, of the forward portion of the slack adjuster; Fig. 4 a section on the line 4—4 of Fig. 2; and Fig. 5 a view of a portion of the slack adjuster, showing the signal indicating member in its indicating position.

Referring now to the drawing, the slack adjusting device illustrated by way of example only comprises two relatively movable parts constituted by a rotatable screw-threaded rod 1 mounted in bearings 2 in a body or supporting member 3, a nut member 4 being provided thereon and adapted to be displaced axially along the rod 1 as the latter is rotated unidirectionally in any manner such as is well known upon movement of the brake lever or levers so as to take up the slack in the rigging. The mechanism employed to rotate the rod 1 is indicated by the reference numeral 5 and comprises a ratchet wheel 20 secured to the rod 1, a pawl 21 adapted to engage the teeth of the ratchet wheel, and a piston 22, to which the pawl 21 is pivotally connected. The piston chamber 23 at the left side of the piston 22, as shown in Fig. 4, is connected to a pipe 24, which leads to and opens into the usual brake cylinder 25, at a point such that when the brake cylinder piston travel exceeds the maximum travel permissible, the pipe 24 is opened to the fluid pressure side of the brake cylinder piston 26, so that fluid under pressure is supplied to the piston chamber 23.

As shown in Figs. 2 and 3, brake operating members 6, adapted to be moved in the direction of its longitudinal axis, are connected to the nut member 4 by means of the trunnions 7 carried by the nut member, and the members 6 have in accordance with the present invention, a link 10 connected thereto through the pin 8, the said link being also connected by pin 14 to an indicating or signal arm 9. As shown in Fig. 2, the brake operating members 6, link 10 and signal arm 9 are in the positions which they occupy originally or after the slack adjuster has been reset so as to be in a condition automatically to take up the slack in the brake rigging. While during use the slack adjuster operates to take up the slack in the rigging by rotating the screw-threaded rod 1, so the nut member 4, members 6 and a brake rod 11 connected to the members 6 through pin 8 are moved towards the left, with the result that the link 10 gradually rotates the signal arm 9 toward the left until when the end 13 of the members 6 arrives at the position shown in Fig. 5. In this position, the arm 9 is perpendicular to the axis of the slack adjuster and is observed in such position from a convenient position at the side of the vehicle. When it is observed that the signal arm 9 is substantially vertical, the slack adjusting device may be reset by rotating the screw-threaded rod 1 by means of the squared end 12 thereof so as to bring the nut 4, members 6, brake rod 11, link 10 and signal arm 9 back to their right hand positions.

Fig. 1 illustrates an application of the slack adjuster to the brake apparatus, the link 11 of the slack adjuster being connected to one end of the brake lever 27 so as to constitute the fulcrum for said lever. The brake lever 27 carries the usual brake head 28, and is connected through rod 29, with the brake cylinder lever 30.

It will be evident that the signal device may readily be applied to any form of slack adjusting device for braking apparatus and that the invention is not limited in its application to the particular construction and arrangement of the parts of the signalling device described in detail hereinbefore which may be varied as desired to suit particular requirements without exceeding the scope of the invention.

Having now described our invention, what we claim as new and desire to secure by Letters Patent, is:—

The combination with a slack adjusting mechanism for taking up the slack in the brake rigging and including a casing, a brake rod, a member connected to said brake rod and operated by said slack adjuster to take up slack, an arm pivotally mounted on said casing, and a link operatively connecting said member with said arm, to thereby move said arm so that the position of the arm indicates the extent to which the slack adjuster has operated to take up slack.

In testimony whereof we have hereunto set our hands, this 11th day of June, 1931.

LOUIS J. LE CLAIR.
ALOYSIUS G. BRACKENBURY.